United States Patent [19]

Crickmore et al.

[11] 4,134,693

[45] Jan. 16, 1979

[54] RESILIENT RIBBON CARTRIDGES FOR BUSINESS MACHINES

[75] Inventors: John D. Crickmore; Ernest R. Radford, both of Sidcup, England

[73] Assignee: Walter Grafton & Son Limited, London, England

[21] Appl. No.: 795,591

[22] Filed: May 10, 1977

[30] Foreign Application Priority Data

May 21, 1976 [GB] United Kingdom ............... 21224/76

[51] Int. Cl.² .............................................. B41J 33/14
[52] U.S. Cl. ................................................. 400/208
[58] Field of Search ........................................ 197/151

[56] References Cited

U.S. PATENT DOCUMENTS

| | | | |
|---|---|---|---|
| 3,045,800 | 7/1962 | Landgraf | 197/151 |
| 3,065,837 | 11/1962 | Di Luco | 197/151 |
| 3,151,724 | 10/1964 | Ross et al. | 197/151 |
| 3,260,344 | 7/1966 | Doyle | 197/151 |
| 3,464,533 | 9/1969 | Gallant | 197/151 |
| 3,478,858 | 11/1969 | Arvai | 197/151 |
| 3,604,549 | 9/1971 | Caudill et al. | 197/151 |
| 3,924,727 | 12/1975 | Morelli | 197/151 |

FOREIGN PATENT DOCUMENTS

2200996  7/1973  Fed. Rep. of Germany ........... 197/151

Primary Examiner—Ernest T. Wright, Jr.
Attorney, Agent, or Firm—Pollock, Vande Sande and Priddy

[57] ABSTRACT

For use in business machines, one-piece holders or cartridges are described for holding spools or cores carrying inked ribbons or coated film ribbons. Each cartridge, although a single permanently integral unit, enables each spool or core to be located in operative position, removed and replaced, the spool or core being located in the cartridge by flanges at its opposite ends, and at least one of these flanges being sufficiently resilient to permit the spool or core to be removed. In one example, a neck at one end of a core can be moved along a slot in one flange to locate a shallow journal in a recess at the end of the slot, the opposite end of the core being located by a bearing hole in the other flange. In another example, a circular flange formed at the end of each spool is journalled in a shallow depression in one cartridge flange in which it is retained by a resilient cartridge flange bearing on the opposite end of the spool. The spools or cores are arranged so that they can be positively driven by the machine mechanism.

6 Claims, 7 Drawing Figures

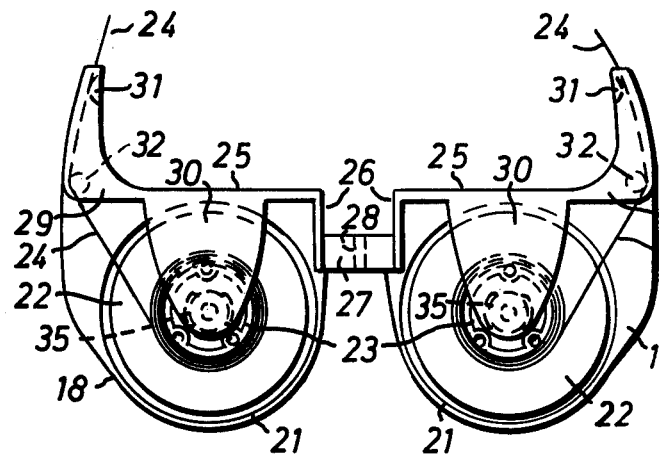 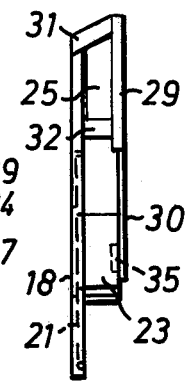 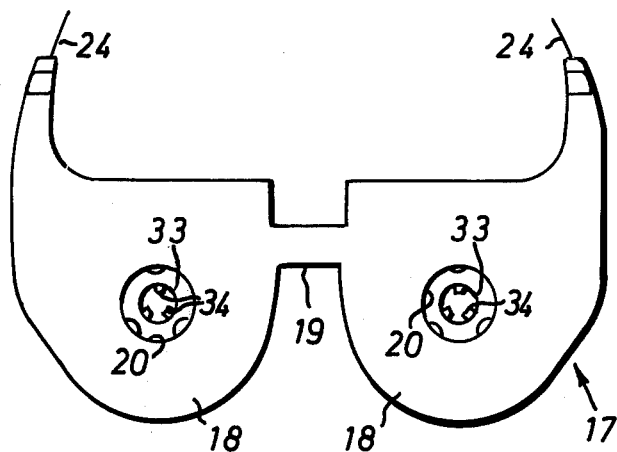

RESILIENT RIBBON CARTRIDGES FOR BUSINESS MACHINES

This invention relates to holders or cartridges, for ribbon spools, or cores, for example for inked ribbons or coated film ribbons to be used in business machines, including printers and acoustic recording and reproducing apparatus. A coated film ribbon may have a coating consisting of a dye or carbon bonded to the ribbon or it may, for example, be coated with an emulsion containing a magnetic or photographic medium. Basically the object of such holders is to provide an easy and clean method of loading the ribbon into the machine and locating the spools or cores for the ribbons in a simple way in business machines. A spool may be defined as a hub or core with a flange at one or each end, and a core as a simple hub around which the ribbon can be wound.

It is normal for such holders or cartridges to be formed in two parts which, after loading with ribbons wound on spools or cores, are assembled together by means of pins with interference fits, heat sealing or some other method. The object of the invention is to provide holders or cartridges which fulfil the same function at less cost to the user and facilitate the winding of ribbon on the spool or core within the holder or the loading of a wound spool or core into the holder. A further object of the invention is to render the ribbon more easily visible so that faults in loading or in the use of the machine can easily be detected and rectified.

According to the invention, a one-piece holder or cartridge for a ribbon spool or core to be replaceably mounted therein, is arranged for an inked ribbon or coated film ribbon to be wound onto or unwound from the spool or core for use when the holder or cartridge is mounted in a business machine, the holder or cartridge being furnished with members forming permanent parts of the holder or cartridge for locating a spool or core for use in the holder or cartridge and enabling the spool or core to be removed from or mounted in the holder or cartridge manually when desired. The term "one-piece" is intended to mean that the holder or cartridge is a permanently integral unit of normally constant shape, but at least partially resilient, the term "resilient" being intended to mean that any change in shape due to application of a force in the ordinary course of use of the unit will be followed by the unit springing back to its normally constant shape on removal of the force. The holder or cartridge may be molded in one piece or, alternatively fabricated into a permanently integral unit from separate parts that are permanently fixed together.

Generally the holder or cartridge will be designed to receive at least two spools or cores and, in that case, it will usually be designed to receive only spools or only cores but it may be designed to receive these items as alternatives.

The said members for locating the spool or core can very conveniently be flanges integral with a portion of the holder or cartridge and arranged so to engage opposite ends of the spool or core, or each spool or core, as to enable the spool or core to rotate while so engaged, but the flanges being exposed at their free ends to enable their separation to be manually increased to enable the spool or core to be mounted or removed, at least one of the flanges being resilient for this purpose.

In order that the invention may be clearly understood and readily carried into effect two cartridges for use with inked ribbons will now be described, by way of example, with reference to the accompanying drawing, in which:

FIG. 5 is a plan view from above of a second cartridge shown with two spools in position;

FIG. 6 is a plan view from below of the cartridge of FIG. 5; and

FIG. 7 is a side elevation of the cartridge of FIG. 5.

Figure 1:
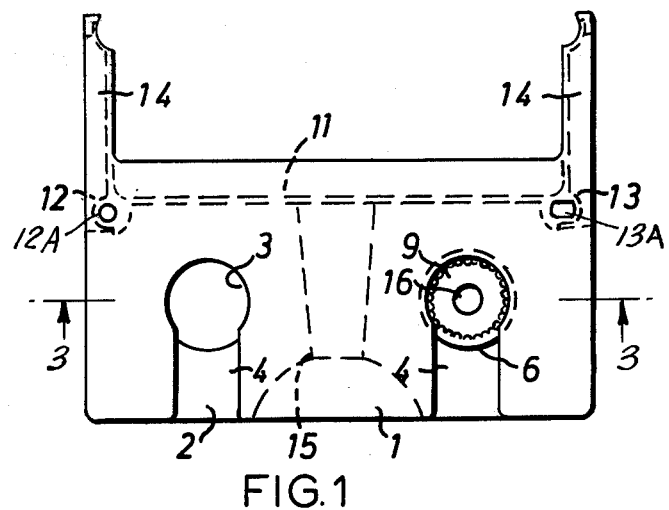
FIG. 1 is a plan view from above of a cartridge for two cores or spools and shown with one spool in position.
Figure 4:
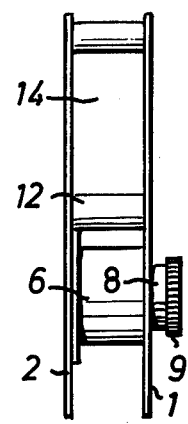
FIG. 4 is a side elevation of the cartridge of FIG. 1.

FIGS. 1 to 4 show a cartridge or spool holder which may be made in one piece, for example moulded from a synthetic plastics material. Alternatively it may be fabricated into one piece as a permanently integral unit from parts of synthetic plastics material or metal. The cartridge is formed with opposed flanges 1, 2 which must be made of material having such natural resilience that two cores or spools, either unwound or wound with inked ribbon, can be sprung between them, the cores or spools being formed with central journals that are received in arcuate recesses 3 at the ends of slots 4 in the flange 1 and in bearings 5 constituted by simple holes in the flange 2. Thus, in the case of cores such as the core shown in the drawing, these may each have a cylinder 6 on which the inked ribbon is wound, a shallow journal 7 that fits into one of the recesses 3, a neck 8 that is narrow enough to pass along the associated slot 4, a knurled finger knob 9 at the top, and a shallow lower journal 10 that fits into a bearing 5. In the case of a spool this would have a circular flange near one or each end located so as to lie just inside the space between the flanges 1, 2.

The flanges 1, 2 project in cantilever fashion from the upper and lower edges of a web 11 reinforced at its ends by struts 12, 13 formed with longitudinal holes 12A, 13A enabling the cartridge to be mounted in a machine. Arms or guides 14 for the ribbon may be formed integrally with the cartridge, if this is necessary for the machine in which the spool holder is to be used. The lower flange 2 is formed with a central reinforcing channel 15.

To remove a core it is simply necessary manually to splay the resilient flanges 1, 2 apart sufficiently for the neck 8 to enter the slot 4 while the journal 10 is lifted out of the bearing 5. It is then easy to slide the core free from the cartridge. Of course, the reverse movements enable the cartridge to be loaded with cores or spools.

Figure 2:
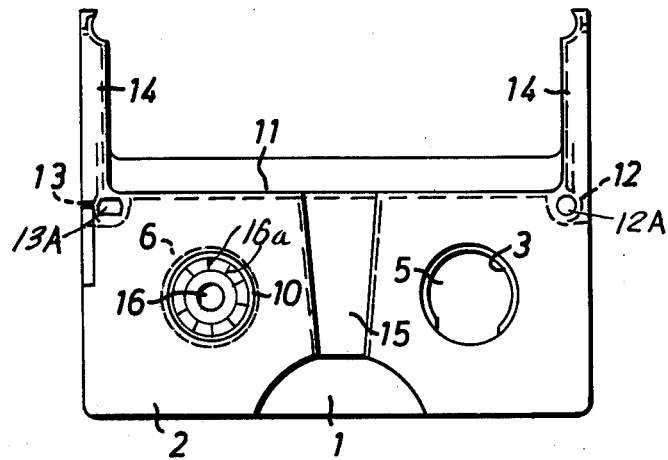
FIG. 2 is a plan view from below of the cartridge of FIG. 1.
Figure 3:
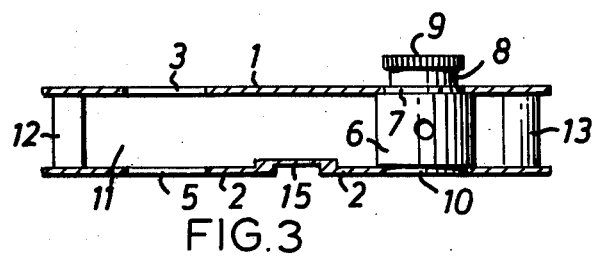
FIG. 3 is a front elevation of the cartridge of FIG. 1 taken along section line 3—3.

The cores or spools are formed so as to be positively driven by spindles in the machine and for this purpose each core, in the present example, is formed with a central bore 16 and radial webs 16a as shown in FIG. 2. As an indication of the size of this particular example it may be said that its maximum width is approximately 8.6 cm.

Referring now to the example of FIGS. 5 to 7, this comprises a lower flange 17 having a flat lower surface (FIG. 6) with two lobes 18 joined by a bridge 19 and each formed with an opening 20. The upper surface of each lobe 18 is formed with a shallow circular depression 21 serving as a journal bearing for a flange 22 of a spool having a hollow hub 23 on which an inked ribbon 24 (not shown in FIG. 7) is wound. Each spool shown in the drawing is of the type having a single flange 22.

Each lobe 18 is formed with a web or wall 25 having arms 26 joined by a bridge 27 connected to the bridge 19 by a web 28 and by the arms 26. An upper flange 29 is formed on each wall 25 and is formed with a flexible flat projection 30 that extends in cantilever fashion over the spool hub 23 to maintain the flange 22 in the depression 21.

The ribbon 24 is guided into and out of the cartridge around curved surfaces 31 on the walls 25 and small struts 32 of circular cross-section between the flange 17 and flanges 29. The spools are driven by spindles that pass through holes 33 in the spool flanges 22 and engage small axial elements 34 projecting through the centers of the hubs 23. To prevent each spool from separating from the cartridge in the event of its flange 22 being dislodged from a depression 21, each flexible projection 30 may be formed with small arcuate ridges 35.

To remove a spool, it is only necessary to resiliently flex the associated projection 30 to enable the flange 22 to be lifted out of the depression 21 and the hub 23 to escape from the ridges 35, if provided.

The cartridge of FIGS. 5 to 7 is moulded in one piece from plastics material. In general, it may be said that, for the various forms of the invention, where a fairly rigid plastics material such as a styreneacrylonitrile is used, this for the flexible parts should be between 1 and 2 mm thick. However, a less rigid material, such as polypropylene, could be made thicker.

The invention has been described above with reference to the drawing purely by way of example and it will be apparent that numerous modifications of these examples can be made without departing from the scope of the invention as defined by the following claims. For example, arms or guides such as the arms 14, become unnecessary and have to be omitted when the invention is applied to cartridges designed for some forms of business machine. Also for example, for some purposes, the cores or spools are not arranged so as to be driven by coaxial business machine spindles, but the cartridge is designed for driving members frictionally to engage the peripheries of the wound ribbons. Yet again, in the case of the cartridge of FIGS. 1 to 4, the bearings 5 may be replaced by recesses and slots similar to the recesses 3 and slots 4.

The invention may also be applied to a known-type of cartridge or spool holder in which a single ribbon spool is used with a loop that is simultaneously unwound from the outer periphery of a spiral of the ribbon on the spool hub and wound onto the spool hub on the inside of the spiral. Thus, in a cartridge such as that shown in FIGS. 1 to 4 the opposed flanges can be shaped to provide a single recess 3, a single slot 4 and a single bearing 5. In a cartridge such as that shown in FIGS. 5 to 7 the cartridge can have flanges providing a single depression 21 and a single projection 30.

We claim:

1. A one-piece ribbon cartridge for a business machine consisting of a single permanently integral unit of substantially constant shape formed with a base portion, said cartridge including first flange means integral with and extending in cantilever fashion from said base portion, and second flange means integral with and extending in cantilever fashion from said base portion in spaced relation to said first flange means, said first and second flange means being located for engaging opposite ends of two ribbon-wound hub members when said hub members are introduced laterally between said first and second flange means, said first and second flange means being formed to mount each of said two hub members for rotation about its axis, said first and second flange means having spaced free flange ends, at least part of at least one of said first and second flange means being capable of resilient deformation relative to said base portion and relative to the other of said first and second flange means whereby the spacing between the spaced free flange ends can be increased manually by such resilient deformation to enable each of said two ribbon-wound hub members to be removed from and replaced into the space between said first and second flange means by lateral movement of said hub members past said spaced free flange ends whereafter release of said resilient deformation enables said first and second flange means to hold each such replaced hub member in its rotatably mounted position, and said cartridge being formed with openings enabling said two ribbon-wound hub members to be rotated in the cartridge by the business machine and the ribbon thereon to circulate through the machine into and out of the cartridge when the cartridge is mounted in a business machine.

2. A one-piece ribbon cartridge according to claim 1, in which said first and second flange means are disposed in substantially parallel superposed relationship, said first and second flange means being formed, for each said hub member, with a slot extending from a free flange end of one of said first and second flange means, and with an arcuate recess, wider than said slot, terminating said slot, and with a journal bearing in the other of said first and second flange means, whereby one end of each said hub member can be mounted in one of said recesses and the other end of said hub member mounted in one of said journal bearings by movement of the hub member through one of said slots.

3. A one-piece ribbon cartridge according to claim 2, in which, for each said hub member, said journal bearing is a simple circular hole in said other flange means.

4. A one-piece ribbon cartridge according to claim 2, wherein each of said hub members is formed coaxially with a cylindrical portion on which said ribbon is wound, with first and second shallow journals at opposite ends of said cylindrical portion for insertion respectively into one of said recesses and into one of said journal bearings, with a neck of reduced diameter to pass along the one of said slots leading into said recess, and with a finger knob, said finger knob, said neck, said first shallow journal, said cylindrical portion, and said second shallow journal being located in that order along the axis of said hub member.

5. A one-piece ribbon cartridge according to claim 1 in which said first flange means comprises a support flange formed with two shallow circular depressions, each shallow circular depression providing a journal bearing for one end of a respective one of said hub members, and said second flange means comprising resilient flange members located so as to engage the other ends of said hub members.

6. A one-piece ribbon cartridge according to claim 5, wherein each of said two hub members is formed with a core portion on which said ribbon is wound and with a circular spool flange at one end of said core portion for location in a respective one of said shallow circular depressions.

* * * * *